US008620835B2

(12) United States Patent
Freedman et al.

(10) Patent No.: US 8,620,835 B2
(45) Date of Patent: Dec. 31, 2013

(54) METHOD FOR IMPLEMENTING THE π/8 GATE IN A GENUS=1 ISING SYSTEM

(75) Inventors: Michael Freedman, Redmond, WA (US); Parsa Bonderson, Santa Barbara, CA (US); Chetan Nayak, Santa Barbara, CA (US); Sankar Das Sarma, Potomac, MD (US)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 12/979,778

(22) Filed: Dec. 28, 2010

(65) Prior Publication Data

US 2011/0156008 A1   Jun. 30, 2011

Related U.S. Application Data

(60) Provisional application No. 61/290,661, filed on Dec. 29, 2009, provisional application No. 61/290,645, filed on Dec. 29, 2009.

(51) Int. Cl.
*G06F 15/18* (2006.01)

(52) U.S. Cl.
USPC .......................................................... 706/12

(58) Field of Classification Search
USPC ................................. 706/12, 45, 62; 712/221
See application file for complete search history.

(56) References Cited

U.S. PATENT DOCUMENTS

| | | | |
|---|---|---|---|
| 7,277,872 B2 | 10/2007 | Raussendorf et al. | |
| 7,321,131 B2 | 1/2008 | Freedman et al. | |
| 7,394,092 B2 | 7/2008 | Freedman et al. | |
| 7,518,138 B2 | 4/2009 | Freedman et al. | |
| 8,058,638 B2 | 11/2011 | Freedman et al. | |
| 2003/0055513 A1* | 3/2003 | Raussendorf et al. | 700/1 |
| 2008/0067496 A1 | 3/2008 | Freedman et al. | |
| 2009/0079421 A1 | 3/2009 | Freedman et al. | |
| 2010/0264910 A1 | 10/2010 | Bonderson | |
| 2011/0161638 A1* | 6/2011 | Freedman et al. | 712/221 |
| 2012/0028806 A1* | 2/2012 | Bonderson et al. | 505/191 |
| 2012/0221268 A1* | 8/2012 | Freedman et al. | 702/64 |
| 2012/0258861 A1 | 10/2012 | Bonderson et al. | |

OTHER PUBLICATIONS

Akhmerov et al., "Electrically Detected Interferometry of Majorana Fermions in a Topological Insulator", Physical Review Letters, The American Physical Society, May 28, 2009, 1-4.

Alicea, "Majorana Fermions in a Tunable Semiconductor Device", Dec. 10, 2009, 1-10.

Freedman et al., "Tilted Interferometry Realizes Universal Quantum Computation in the Ising TQFT without Overpasses", Feb. 2, 2008, 1-23.

Freedman et al., "Towards Universal Topological Quantum Computation in the v=5/2 Fractional Quantum Hall State", Dec. 5, 2005, 1-23.

(Continued)

*Primary Examiner* — David Vincent
(74) *Attorney, Agent, or Firm* — Lyon & Harr, LLP; Richard T. Lyon

(57) ABSTRACT

Disclosed herein is a protocol that enables the π/8-gate in chiral topological superconductors in which superconducting stiffness λ has been suppressed. The protocol enables a topologically protected π/8-gate in any pure Ising system that can be fabricated into genus=1 surface. By adding the π/8-gate to previously known techniques, a design for universal topologically protected quantum computation which may be implemented using rather conventional materials may be obtained.

7 Claims, 6 Drawing Sheets

(56) References Cited

OTHER PUBLICATIONS

Fu et al., "Probing Neutral Majorana Fermion Edge Modes with Charge Transport", Physical Review Letters, The American Physical Society, May 28, 2009, 1-4.

Fu et al., "Superconducting Proximity Effect and Majorana Fermions at the Surface of a Topological Insulator", Physical Review Letters, The American Physical Society, Mar. 6, 2008, 1-4.

Sau et al., "A Generic New Platform for Topological Quantum Computation using Semiconductor Heterostructures", Jul. 17, 2009, 1-5.

Zhou, X., D. W. Leung, I. L. Chuang, Methodology for quantum logic gate constructions, Physical Review A, vol. 62, Aug. 2000, pp. 1-17.

Bonderson, P., M. Freeman, C. Nayak, Measurement-only topological quantum computation via anyonic interferometry, Annals of Physics, Oct. 2008, pp. 787-826.

Vincent, David Robert, U.S. Office Action, U.S. Appl. No. 12/979,778, Apr. 15, 2013, pp. 1-12.

Duan, L. M., E. Demler, M. D. Lukin, Controlling spin exchange interactions of ultracold atoms in optical lattices, Phys Rev Lett., Aug. 29, 2003, pp. 4, vol. 91, No. 9.

Kitaev, A., Anyons in an exactly solved model and beyond, Annals of Physics, Jan. 2006, pp. 2-111, vol. 321, No. 1.

Q1, X.-L., T. L. Hughes, S.-C. Zhang, Chiral topological superconductor from the quantum Hall state, Phys. Rev. B, Nov. 2010, pp. 5, vol. 82, No. 18.

\* cited by examiner $|1$ spin $\sigma$    $|\sigma$ spin $\frac{1}{2}$    $\}\psi$ spin 1   (particle types)

$\frac{1}{2} \otimes \frac{1}{2} = 0 \oplus 1$    $\frac{1}{2} \otimes 1 = \frac{1}{2}$    $1 \otimes 1 = 0$ (fusion)

$$\bowtie = \begin{vmatrix} 1 & \psi \\ \frac{1}{\sqrt{2}} & \frac{1}{\sqrt{2}} \\ \frac{1}{\sqrt{2}} & -\frac{1}{\sqrt{2}} \end{vmatrix}$$

(F)

$$S_{\alpha\beta} = \frac{1}{2} \begin{vmatrix} 1 & \sqrt{2} & 1 \\ \sqrt{2} & 0 & -\sqrt{2} \\ 1 & -\sqrt{2} & 1 \end{vmatrix}, \quad S_{\sigma\sigma}^{\psi} = e^{-\frac{i\pi}{4}}$$

act by
$$\begin{array}{c} m \\ l \end{array} \begin{vmatrix} 0 & 1 \\ -1 & 0 \end{vmatrix}$$

q-dim: $d_0 = 1 \quad d_2 = \sqrt{2} \quad d_2 = 1$    twist: $\bigcirc = e^{\frac{i\pi}{8}}$, $\bigcirc = -$ R $\begin{cases} = e^{-\frac{i\pi}{8}} \quad \quad = e^{\frac{3i\pi}{8}} \quad \quad = - \\ = e^{-\frac{i\pi}{2}} \quad \quad = e^{-\frac{i\pi}{2}} \end{cases}$ $\times = - \times$ , total quantum dim $= \mathcal{D} = 2$, central charge $c = \frac{1}{2}$

FIG. 1

METHOD FOR IMPLEMENTING THE π/8 GATE IN A GENUS=1 ISING SYSTEM

CROSS-REFERENCE TO RELATED APPLICATIONS

This application claims benefit under 35 U.S.C. §119(e) of provisional U.S. patent application no. 61/290,661, filed Dec. 29, 2009, and of provisional U.S. patent application no. 61/290,645, filed Dec. 29, 2009.

This application is related to U.S. patent application Ser. No. 12/979,856 [entitled Ising Systems: Helical Band Geometry For DTC And Integration Of DTC Into A Universal Quantum Computational Protocol], filed on even date herewith.

The entire disclosure of each of the foregoing applications is incorporated herein by reference.

TECHNICAL FIELD

The subject matter disclosed and claimed herein relates generally to the field of quantum computing. Specifically, the subject matter disclosed and claimed herein relates to methods for implementing the π/8 gate in a genus=1 Ising system.

BACKGROUND

The term "Ising system" may be used herein to denote any physical system, particularly a two-dimensional electron gas (2DEG) whose low energy effective theory is governed by the Ising topological quantum field theory (TQFT). Below, the defining characteristics of the Ising TQFT are set out in tabular form using the notation and formalism of modular tensor categories (MTC). Although the structure appears to require much data, actually this direct description of properties is quite redundant: according to Kitaev, there are precisely eight theories with the Ising fusion rules and these can be distinguished by a Chern class.

A microscopic construction of the Ising system was given in Kitaev [arXiv:cond-mat/050506438v3], incorporated herein by reference, and realization in optical lattices discussed in Duan, et al. [Phys. Rev. Lett., 91(9):090402, August 2003], incorporated herein by reference. The original microscopics was defined on a honeycomb lattice, but the only essential feature is that the bonds can be grouped into three distinct classes—x, y, and z—so that, at all vertices, exactly one bond from each class is present. This weaker condition allows the construction of such lattices on surfaces of any genus.

Another road to the Ising TQFT is through $p_x+ip_y$ superconducting 2DEGs. Such systems are predicted, based on elementary band theory, to arise in a variety of 2D-systems from a spin-orbit coupled semiconductor with superconductivity imported via proximity effect. Examples include Sau, et al. [arXiv:cond-mat/0907.2239v3], Alicea [arXiv:cond-mat/0912.2115v1], and Qi, et al. [arXiv:cond-mat/1003.5448v1], each of which is incorporated herein by reference. Such systems are chiral topological superconductors and support localized Majorana states.

These systems are not purely topological, but, being superconductors, also support a classical order parameter φ If the system is not planar, but configured as a surface of genus >0, a significant stiffness term $\lambda |\nabla \phi|^2$ in the Lagrangian may prevent superposition of certain topological states, which are correlated with the winding of φ, a classical quantity for extensive superconductors.

Within the Ising TQFT, braid operations, together with nondemolition measurement of the collective charge of up to four σ-particles, supports the implementation of all Clifford operations. It is known that if the "π/8-gate,"

$$\begin{array}{c}|1\rangle \\ |\phi\rangle\end{array} \begin{vmatrix} \varepsilon^{i\pi/8} & 0 \\ 0 & \varepsilon^{-i\pi/8} \end{vmatrix},$$

is added to the Clifford operations, a computationally universal gate results.

SUMMARY

Disclosed herein is a protocol that enables the π/8-gate in chiral topological superconductors in which superconducting stiffness λ, has been suppressed. The protocol enables a topologically protected π/8-gate in any pure Ising system that can be fabricated into genus=1 surface. By adding the π/8-gate to previously known techniques, a design for universal topologically protected quantum computation which may be implemented using rather conventional materials may be obtained.

BRIEF DESCRIPTION OF THE DRAWINGS

FIG. 1 provides data for Ising TQFT.

DETAILED DESCRIPTION OF ILLUSTRATIVE EMBODIMENTS

The parent system to a purely Ising TQFT may be any semiconductor/superconducting system resulting in a "generic (no special symmetries) 2D topological superconducting film with a single sheeted Dirac-like Fermi surface." Our terminology sometimes identifies such a state (called X) in our provisional patent application no. 61/290,645 with the Ising sandwich structure which houses it. A suitable physical substrate for the systems disclosed herein could derive from the experimental effort to realize any of the three "sandwich structures" (see, e.g., Sau, et al., Alicea, and Qi, et al.). Essentially, the stiffness λ may be reduced by (1) quantum fluctuation of φ, e.g., in a granular superconductor where particle number becomes classical and the dual observable φ fluctuates, and (2) a second order phase transition from the $p_x+ip_y$ superconducting state to pure Ising, i.e., induced by condensation of pairs of Abrikosov vortices. The experimental signature of a sandwich structure in a pure Ising state would be (1) the loss of superconductivity, together with (2) the retention of a chiral gapless neutral mode capable of transporting energy at the system edge.

We use the notation X for any 2DEG in a pure Ising TQFT state or, alternatively, superconducting $p_x+ip_y$ 2DEG in which the superconducting stiffness is sufficiently small.

Central Protocol

The state X is housed in a dynamical topology changing device (DTC) and the extent of X at any given instant of time is regulated by electric and/or magnetic gating. A DTC is a 3D device grown in layers using molecular beam epitoxy (MBE) and/or other techniques so that the central 2DEG interface in state X is contorted into a curved surface of genus=1. Electric and/or magnetic gates can, on a $10^{-6}$-$10^{-8}$ second time scale, regulate exactly which portion of the curved interface is actively in state X at any given time t. The gates do this either by using charge to expel electrons from the 2DEG where they are unwanted, or applying a magnetic field to alter the physical properties of the 2DEG to make it effectively a vacuum and so create a new edge to the state X. The initial qubit is stored in the "pair of points" obtained by expelling state X from the "handle" of the DTC. Since only the topological time sequence of shapes for X is critical, we describe the time history by marking curves and points not included in X(t), X at time=t. Physically, a neighborhood of the indicated curves and/or points will also be "vacuum," i.e., not in X(t).

Figure 2:
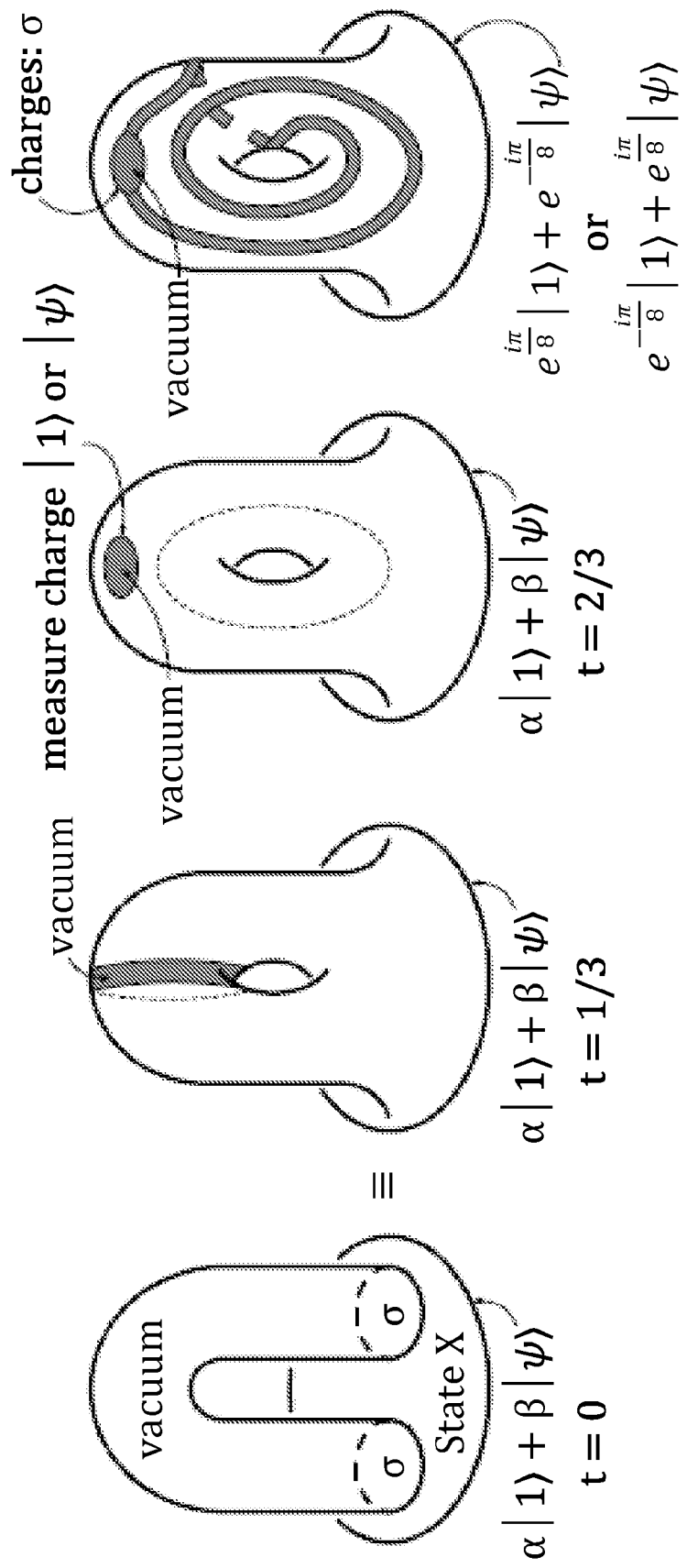
FIG. 2 shows the time history of an initial protocol for a π/8 gate.

FIG. 2 shows the time history (vacuum in bold) of the initial protocol for the π/8 gate. It is necessary to perform a quasi-particle interferometry measurement at time t=⅔ to determine the charge |1> or |φ> around the vacuum boundary at the top: if |1>, the central protocol executes the π/8 gate, and if |φ>, the protocol executes its inverse, which can be corrected to the desired gate by a Pauli braid operation $$\begin{vmatrix} 1 & 0 \\ 0 & i \end{vmatrix}$$

lying within the Clifford group. The protocol is a variant of that described in Bonderson, et al. [arXiv:1003.2856v1], incorporated by reference, and its analysis is similar.

The stiffness parameter λ must be zero (or small) because near time t=⅔, as above, the state X occupies a surface of positive genus. From the Ising data table above, the topological charge along the dotted loop γ will be $$\frac{\sqrt{2}}{2}\alpha|1\rangle + e^{\frac{-i\pi}{4}}\beta|\sigma\rangle + \frac{\sqrt{2}}{2}e^{\frac{3i\pi}{8}}|\psi\rangle,$$

requiring a superposition of even (2π) winding of φ for |1> and |ψ> and odd (2π) winding of φ for |σ>.

The central protocol shown in FIG. 2 includes starting with a standard Ising qubit in a DTC, and then "filling" with state X during time t∈[0, ⅔]. This occurs within the DTC by applying gates to realize a state X2DEG, except near one point p. The charge |1> or |ψ> may be measured along the boundary surrounding p and the measurement outcome recorded classically. During time t∈[⅔, 1], the portion of the DTC near the (1, −2)-curve indicated in the leftmost portion of FIG. 2 may be "unfilled." The "unfilling" may be accomplished by gates on the DTC.

Figure 3:
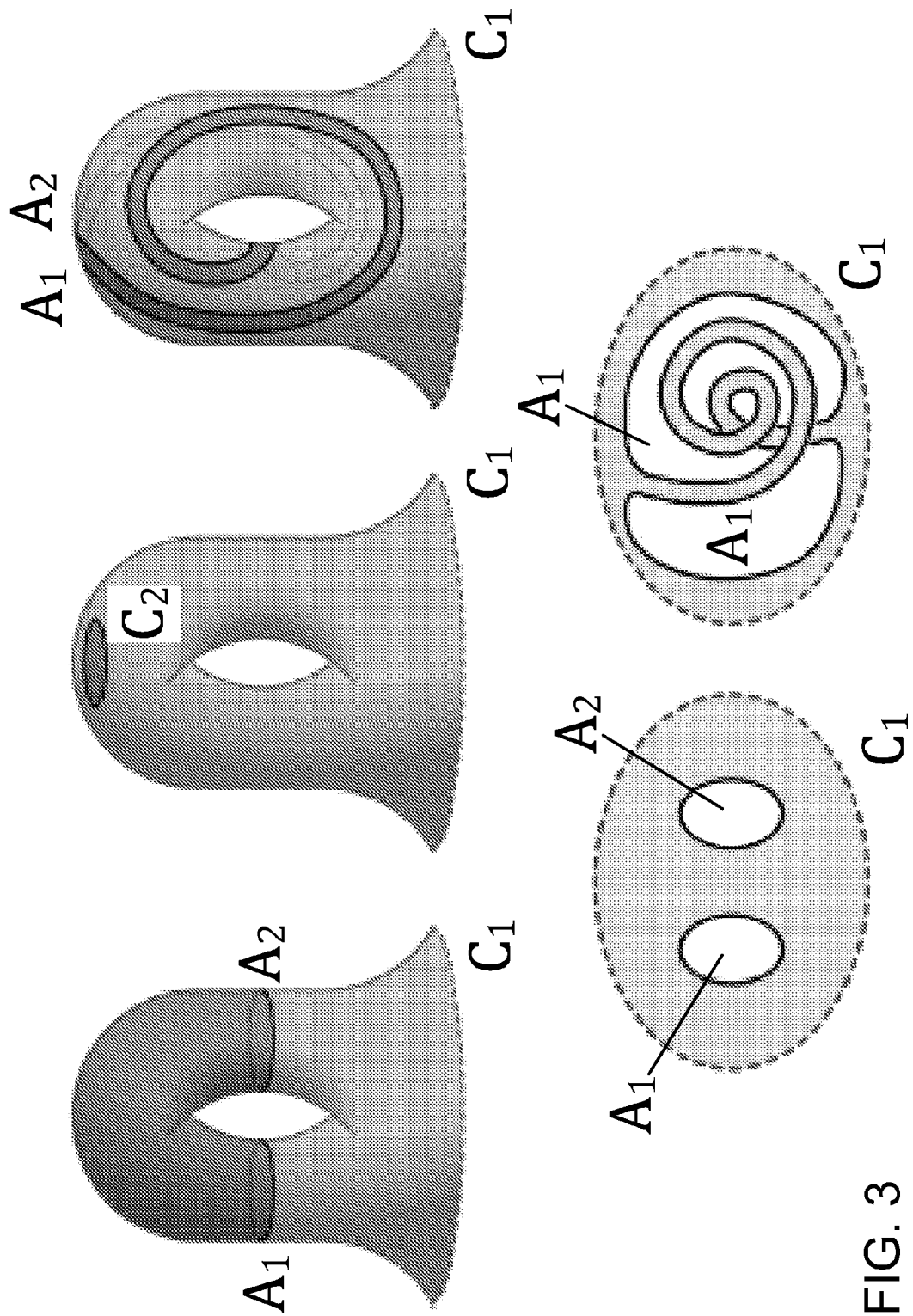
FIG. 3 depicts DTC structures for a topological fluid.

The above may be refereed to as the "central" protocol. In order to have a complete, functioning protocol for the π/8 gate from a standard fixed planar qubit back to itself, the central protocol may be preceded and followed by teleportation protocols which may be referred to as "into" and "out of" The following diagrams in the notation of MTC describe these teleportation protocols. Note that the "out of" protocol calls for interferometry along a loop δ which, in part, runs through the DTC in the rightmost depiction in FIG. 2 parallel to the (1, −2) edge to vacuum. The required length of δ is the most demanding aspect of the π/8-gate protocols. FIG. 3 depicts DTC structures for the topological fluid.

Figure 4:
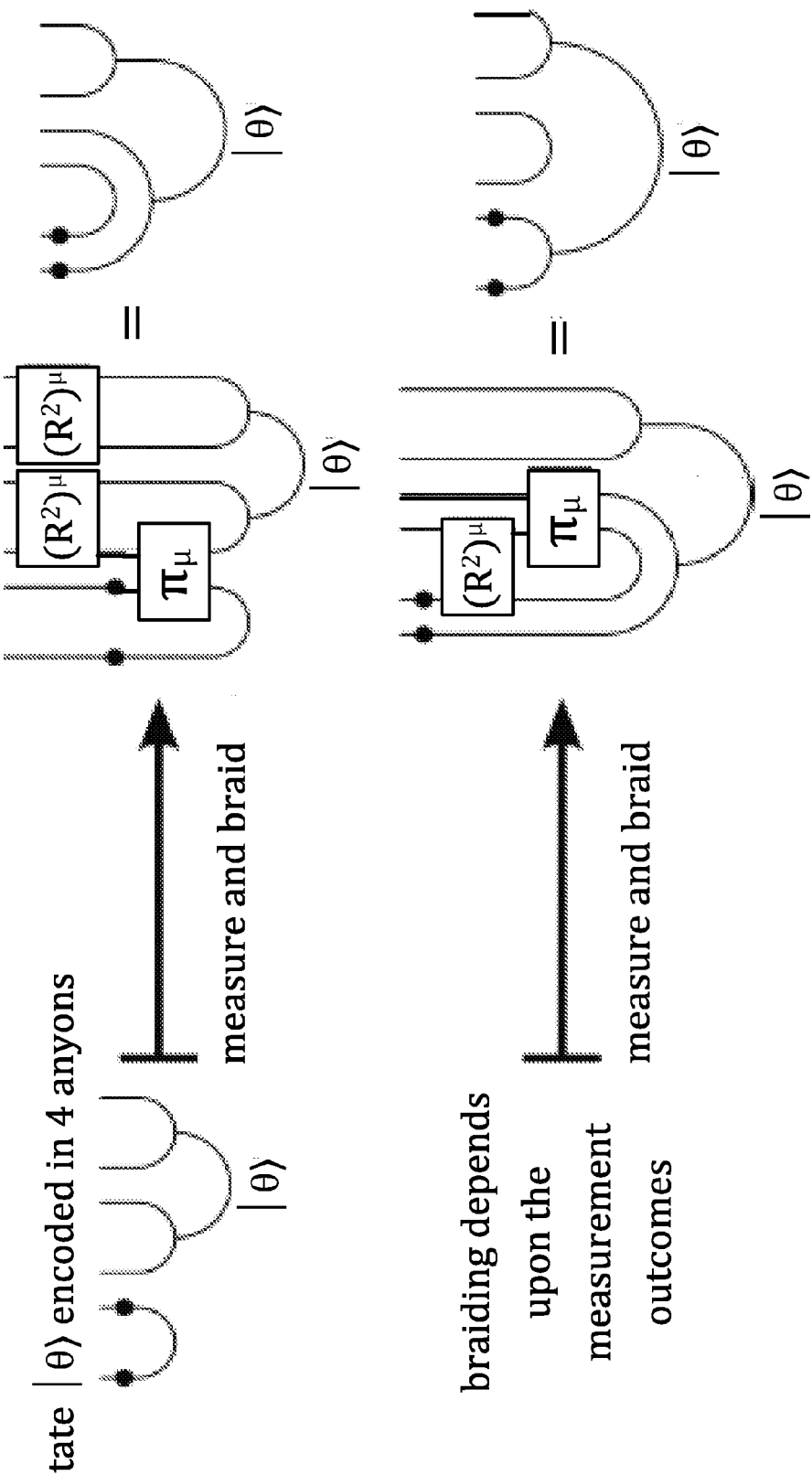
FIG. 4 illustrates anyonic teleportation of quantum information into twisted qubits.
Figure 5:
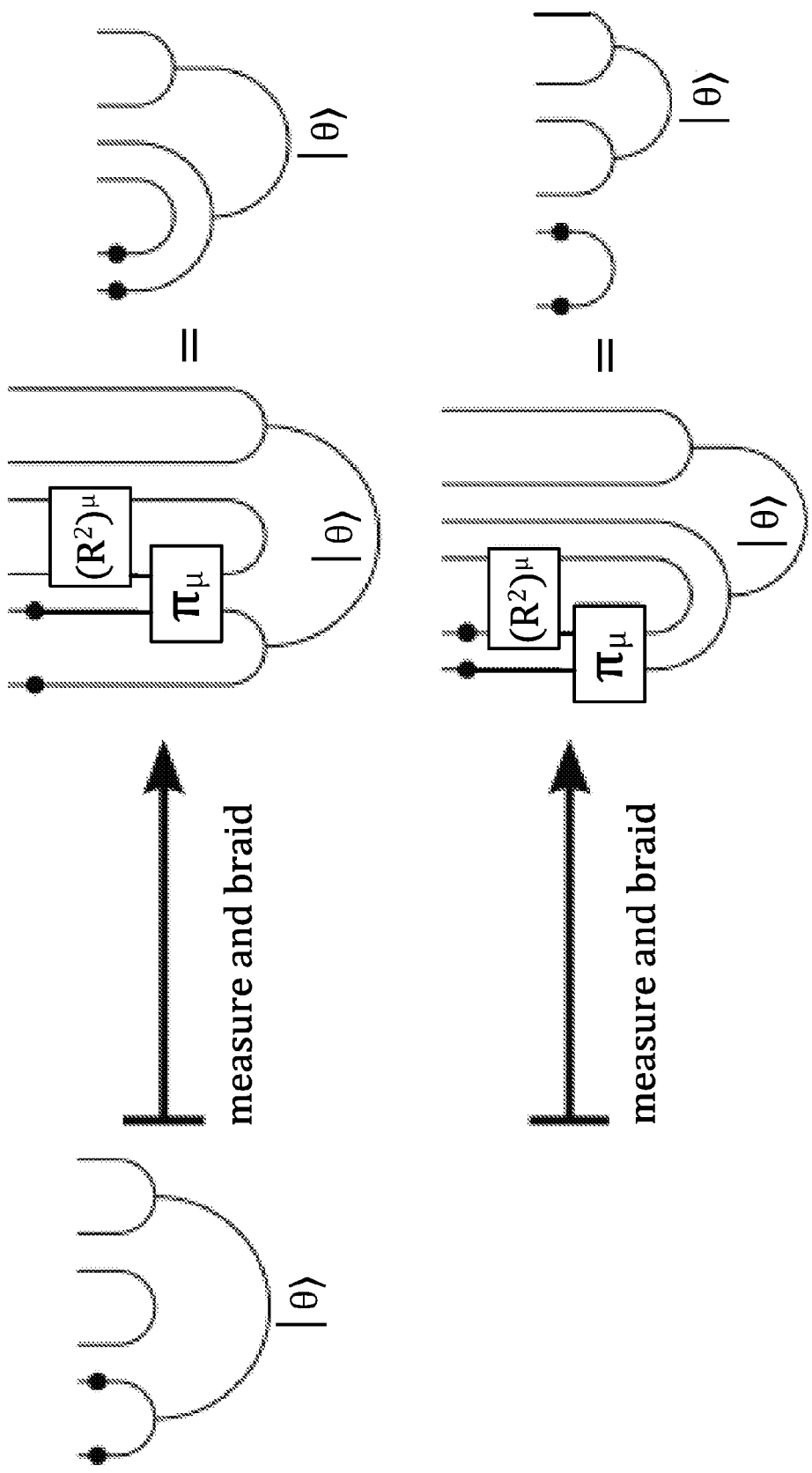
FIG. 5 illustrates anyonic teleportation of quantum information out of twisted qubits.

Anyonic teleportation of quantum information in and out of twisted qubits is shown in FIGS. 4 and 5, respectively. The notation used for the "into" and "out of" protocols which are to be applied before and after the central protocol are:

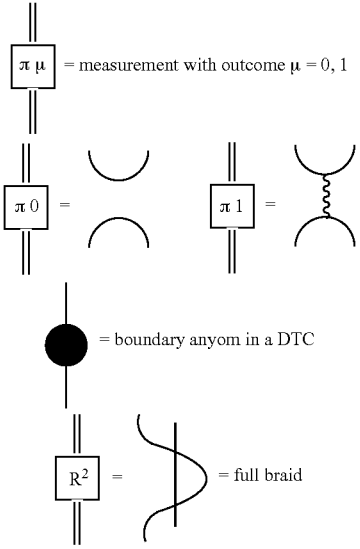

$|\theta\rangle=\alpha|1\rangle+\beta|\psi\rangle$

The composition of protocols "into," "central," and "out of" realizes in a topologically protected manner either the π/8 gate or its inverse. The measurement outcome |1> or |ψ> during the central protocol tells us which. If |ψ> is observed, the inverse gate is effected. To rectify that situation, composition with the braid generator $$\begin{vmatrix} 1 & 0 \\ 0 & i \end{vmatrix}$$

is required. We call the totality of steps the "final protocol."

Example Computing Environment

Figure 6:
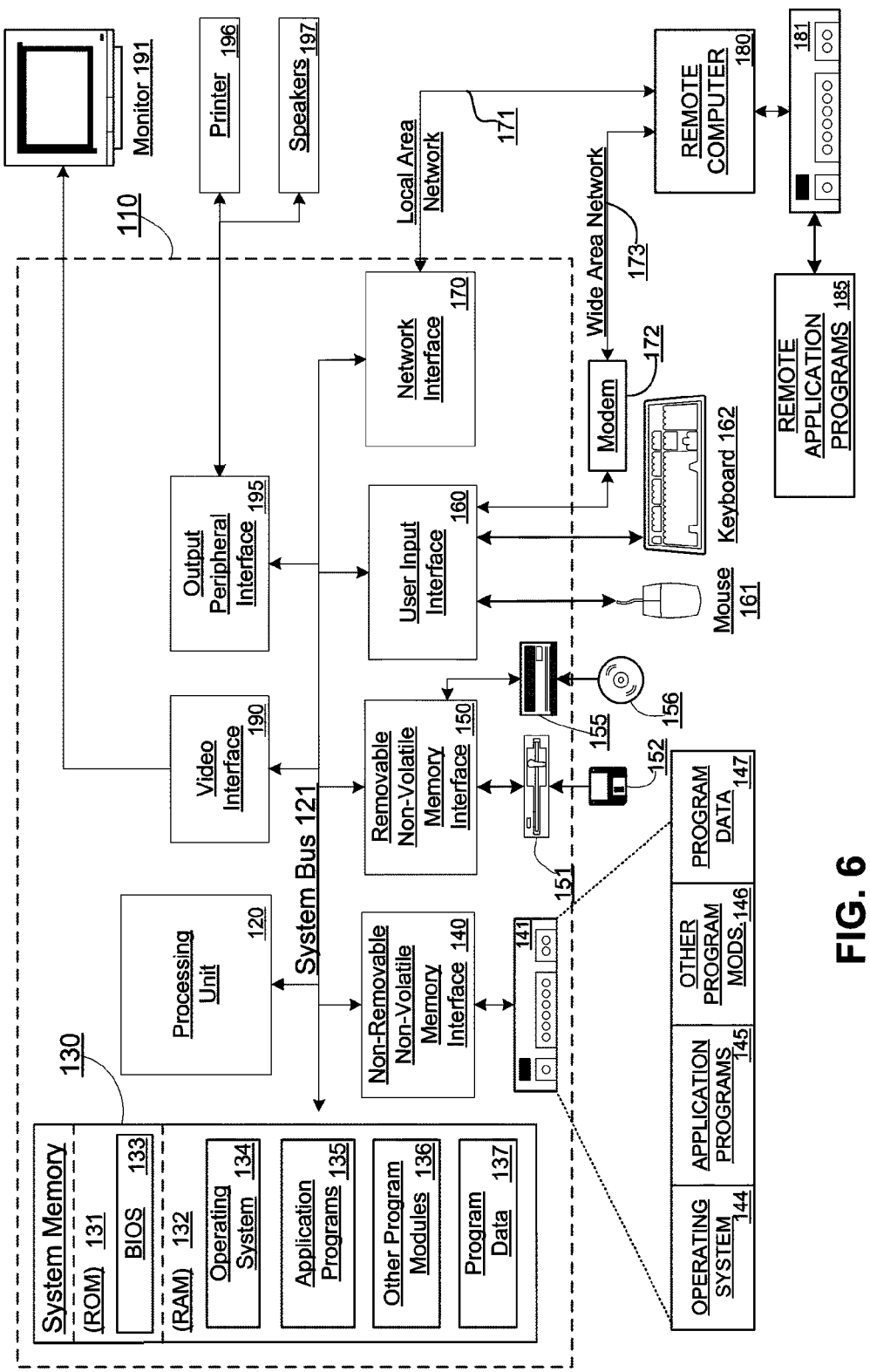
FIG. 6 depicts an example classical computing environment.

FIG. 6 shows an example computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 6 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

What is claimed:

1. A method for implementing a $\pi/8$ gate in a genus=1 Ising system, the method comprising:
providing a standard Ising qubit in a dynamical topology changing device (DTC);
filling with a state X during a first time $\tau \in [0, 2/3]$;
measuring a charge $|1\rangle$ or $|\psi\rangle$ along a boundary of the DTC; and
recording the measurement classically.

2. The method of claim 1, wherein the filling occurs within the DTC.

3. The method of claim 1, wherein the filling occurs within the DTC by applying gates to realize a state X 2DEG.

4. The method of claim 1, wherein the filling occurs within the DTC by applying gates to realize a state X 2DEG, except near a certain point p.

5. The method of claim 4, wherein the charge $|1\rangle$ or $|\psi\rangle$ is measured along a boundary surrounding the point p.

6. The method of claim 1, further comprising unfilling a portion of the DTC near a (1, −2)-curve during a time $\tau \in [2/3, 1]$.

7. The method of claim 6, wherein the unfilling is accomplished by applying gates on the DTC.

* * * * *